United States Patent [19]

Wood

[11] Patent Number: 5,188,533
[45] Date of Patent: Feb. 23, 1993

[54] SPEECH SYNTHESIZING INDICIA FOR INTERACTIVE LEARNING

[76] Inventor: Michael C. Wood, 746 Augusta Dr., Morage, Calif. 94556

[21] Appl. No.: 754,989

[22] Filed: Sep. 5, 1991

Related U.S. Application Data

[63] Continuation-in-part of Ser. No. 531,824, Jun. 1, 1990, abandoned.

[51] Int. Cl.⁵ .............................................. G09B 5/00
[52] U.S. Cl. ..................................... 434/169; 434/111; 434/335; 434/339; 434/178
[58] Field of Search ................ 434/167, 169, 171, 176, 434/178, 335, 339

[56] References Cited

U.S. PATENT DOCUMENTS

| | | | |
|---|---|---|---|
| 4,353,700 | 10/1982 | Volakakis | 434/171 X |
| 4,357,489 | 11/1982 | Henderson et al. | 434/339 X |
| 4,403,965 | 9/1983 | Hawkins | 434/52 |
| 4,646,350 | 2/1987 | Batra | 381/51 |
| 4,689,817 | 8/1987 | Kroon | 434/169 X |
| 4,703,573 | 11/1987 | Montgomery et al. | 434/51 |
| 4,854,879 | 8/1989 | Chang | 434/339 |
| 4,990,092 | 2/1991 | Cummings | 434/339 X |
| 4,997,374 | 3/1991 | Simone | 434/178 X |

FOREIGN PATENT DOCUMENTS

2020077A 11/1979 United Kingdom ................. 434/176

OTHER PUBLICATIONS

Medical and Biological Engineering and Computing: Verbal Communication Aid for Nonvocal Patients, Jan. 1979, @ p. 103.

Master Specialities Company Catalog No. 3041, Solid Stated Automatic Number Announcer, Jul. 16, 1973.
EDN Design News, Feb. 20, 1978: C-based Key-to-speech Synthesizer Gives Stroke Victims a Voice, by Sam Davis.
Electronics Review, Mar. 27, 1980: Pair of Chips Synthesizes Lifelike Speech, by Bruce Le Boss.

*Primary Examiner*—Gene Mancene
*Assistant Examiner*—L. Thomas
*Attorney, Agent, or Firm*—Graham & James

[57] ABSTRACT

A three-dimensional indicia bearing unit, including a voice synthesis chip, battery and amplifier/speaker (8) for synthesizing an audible sound for educational purposes such as an interactive method for learning to read. The audible sound produced is the name and/or associated sound of the indicia bearing unit. The indicia bearing unit may be a letter, number, or alternatively, short vowel, long vowel form of a letter to produce the audible sound of the phonetic pronunciation of the letter. A plurality of unique indicia bearing units organized in a selected sequence form a set retained in a book like holder. The chip, battery and amplifier/speaker may be self-contained within each indicia bearing unit. Alternatively, the indicia bearing unit may have a book configuration with several three-dimensional letters or numbers in a fixed or removable configuration where the chip, battery and amplifier/speaker are contained within the book-like unit, the removable three dimensional letters or numbers acting as an electrical contact switch, or having individual radio frequency transmitters which send a dedicated radio frequency signal to a receiver contained within the indicia bearing unit, to activate the voice synthesis chip and produce an audible sound represented by the applicable indicia.

16 Claims, 3 Drawing Sheets

SPEECH SYNTHESIZING INDICIA FOR INTERACTIVE LEARNING

This application is a continuation-in-part of U.S. patent application Ser. No. 07/531,824 filed Jun. 1, 1990 now abandoned for Speech Synthesized Indicia Bearing Units And Interactive Method Of Learning To Read.

BACKGROUND OF THE INVENTION

Children learn letters, numbers and the names of various objects by audible repetition accompanied with visualization of the object. Often, a parent or teacher will read a book aloud while pointing to the object depicted by the word which is read. In this way, the child is able to visually associate the object with its name. This method of teaching is generally passive, i.e., there may be little interaction between the child and subject matter. Interactive teaching methods using multiple sensory perceptions are more effective than mere memorization.

Voice synthesizers are used as communication devices for disabled adults. One such example is described in *Medical & Biological Engineering and Computing*, January 1979, titled "Verbal Communication Aid for Non-Vocal Patients." This article describes a voice synthesizer to speed communication for speech impaired patients. Each device includes a keyboard networked via a commercial telephone by a wire connection to a central voice generating system. The use of the central system permits many individual boards to employ a single-control unit, thereby reducing the total cost of each device. In this way, a number of boards in a single geographic area can utilize the same control unit. This device may additionally be used as a teaching or translation aid. In such an application, the keys are covered with letters or numbers and, when depressed, produce a voice response. This device is advantageous in that a child may use the device interactively alone, without close supervision. The parent or teacher can then attend to other matters. However, the keys are substantially identical, the differences appearing only in a typed letter on each key.

An article title "$\mu$ C-Based Key-to-Speech Synthesizer Gives Stroke Victims A Voice" (*EDN Desion News* Feb. 20, 1978) by Sam Davis discloses a system for producing the basic sounds of speech. Each spoken word is broken into phonemes to simulate a word. This system uses phonemic command words to control a synthesizer.

Other devices use voice synthesis devices for various purposes. U.S. Pat. Nos. 4,357,489 to Henderson, et al., assigned to Texas Instruments Incorporated, and U.S. Pat. No. 4,689,817 to Kroon each disclose an integrated circuit for synthesizing speech. U.S. Pat. No. 4,646,350 to Batra employs such an integrated circuit in a child's shoe to provide an audible message when opening of closing the shoe.

Prior art devices, however, fail to provide meaningful visual indicia attractive to children which can facilitate learning when incorporating voice synthesis devices. The device described herein provides many advantages over prior art devices in such a way as to invite interaction with children and facilitate the learning process for speaking, reading and memorization.

SUMMARY OF THE INVENTION

The present invention generally relates to an u interactive learning device having electronic circuitry for generating an audible sound in response to touch contact with the device. More specifically, the device relates to an interactive learning device having one or more touch sensitive three dimensional indicia each representing a letter or number which, upon touching, activates voice synthesis circuitry to audibly produce the name or phonetic sounds of the indicia. Thus, upon interaction with the indicia, the user can make a relationship between the symbols of letters or numbers represented by the indicia to the sounds and names associated with those symbols.

The present invention includes an indicia bearing unit having a voice synthesis integrated circuit or chip electrically coupled to an amplifier and a speaker. The indicia bearing unit has one or more three dimensional indicia each with a touch sensitive surface switch mechanism. The touch sensitive surface is electrically coupled to the synthesis circuitry to activate the synthesis chip upon user contact. Touching an indicia produces an audible synthesized voice representing an assigned sound or phoneme. The phoneme, a combination of vowels or consonants that make up the basic sounds of speech, represents the name or phonetic sound associated with the indicia. For example, the name of the letter "a" or the phonetic assigned to the letter "a".

In the preferred embodiment of the invention, the indicia bearing unit is configured as a single alphabetic or numeric symbol. The indicia bearing unit comprises a touch sensitive surface electrically coupled to a voice synthesis integrated circuit or chip, an amplifier and speaker along with the necessary power source, such as a battery.

The preferred embodiment can be combined with an indicia housing substrate. Preferably, the housing is configured as a folding book capable of retaining a plurality of indicia bearing units. The book has a number of indicia seats or cutouts corresponding to the three dimensional configuration of each of the particular indicia bearing units used with the housing to provide assigned seating patterns such as the sequence of letters in the english alphabet, patterns of alphabetic indicia bearing units to spell particular words such as "cat", or numeric sequences such as numbers from one to ten. Alternatively, the housing can be a simple linear card or template with cutouts to receive the selected indicia rather than a book form. Because each indicia bearing unit has its own synthesis circuitry and speaker, the indicia bearing units can be activated while contained in the housing or while outside the housing.

In an alternate embodiment of the invention, the indicia bearing unit itself is configured as a book having a plurality of fixed, three dimensional or raised surface indicia on the inside front and back cover. Each indicia has a switch means electrically connected to a voice synthesis chip. The synthesis chip is coupled to a memory device in this embodiment which stores synthesizing information pertaining to each individual indicia, whether alphabetic or numeric. Touching a particular indicia activates the chip which retrieves the relevant memory information to synthesize an assigned signal necessary to produces the name or sound associated with the indicia through the speaker.

In a third embodiment, book configuration indicia bearing unit is modified to allow the three dimensional indicia to be removable. In this embodiment, each individual indicia does not have its own independent voice synthesis circuitry and speaker but has an assigned recess corresponding to the shape of the indicia. Each recess has a switch means which is activated by pressing the assigned indicia into the recess. Pressing the indicia into the recess triggers the resident voice synthesis circuitry and speaker in the book shaped indicia bearing unit.

In a fourth embodiment, the book configured indicia bearing unit just described is further modified to include a single radio frequency receiver which replaces each switch means within the recesses. Each individual indicia in this embodiment is fully removable but is modified to include a small radio frequency transmitter which is activated by touch sensitive surface on the indicia. User contact with the touch sensitive surface activates the transmitter of the indicia which transmits a radio frequency signal to the receiver in the book configured indicia bearing unit. The receiver receives the signal and subsequently triggers the voice synthesis chip to generate the audible sound. Each indicia has a discrete radio frequency which is identified by the receiver and synthesis chip circuitry to produce the voice synthesis information assigned to that indicia. Therefore, each indicia can be used to trigger the assigned audible response when positioned in the individual recesses of the book indicia bearing unit or positioned outside the recess and within a reasonable distance.

In each embodiment, the device responds to touch by the user to facilitating interactive learning and play. The invention can be configured to generate either the name or phonetic sounds of the indicia, the indicia can be alphabetic or numeric characters, and can be configured to represent the symbols and associate phonemes of any language.

Other features and advantages of the invention will appear from the following description in which the preferred embodiments has been set forth in detail and conjunction with the accompanying drawings.

DETAILED DESCRIPTION OF THE PREFERRED EMBODIMENTS

Figure 1:
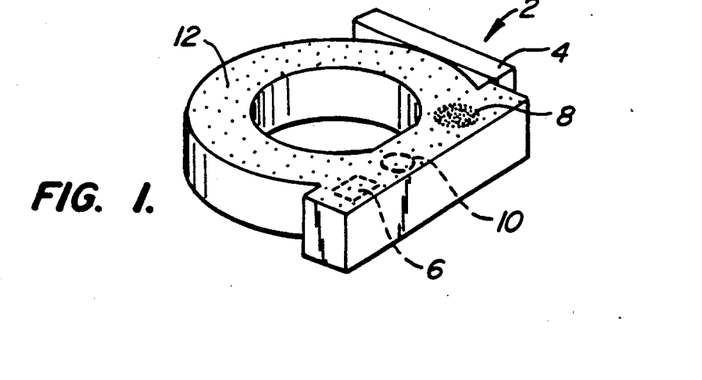
FIG. 1 is a perspective view of a sample indicia bearing unit of the preferred embodiment of the invention configured as a three dimensional alphabetic letter.

Referring now to the drawings, FIG. 1 illustrates an indicia bearing unit 2 constructed in accordance with the present invention. In the preferred embodiment, each indicia bearing unit 2 is an individual three-dimensional tactile toy providing interactive learning and animated play. For illustrative purposes only, FIG. 1 illustrates indicia bearing unit 2 as the letter "a" having a macron 4. Indicia bearing unit 2 can be formed in the shape of any letter or number as will be more fully described below. Regardless of external form indicia bearing unit 2 includes a synthesizer chip 6, an amplifier and speaker assembly 8 and battery 10. Chip 6, amplifier and speaker assembly 8 and battery 10 are completely contained within indicia bearing unit 2.

All the necessary electronic circuitry for voice synthesis is contained in the indicia bearing unit 2. Each indicia bearing unit 2 includes touch sensitive surface 12 acting as a switch electrically coupled to the voice synthesis chip 6. Contact with touch sensitive surface 12 triggers chip 6. Upon activation, chip 6 generates a preselected frequency signal and sends the signal to amplifier and speaker assembly 8. Assembly 8 converts the signal to produce an audible sound in the form of a synthesized voice. The sound may be either the name of the indicia (a number or letter, for example) or its phonetic pronunciation.

Chip 6 comprises an integrated circuit speech synthesis system, for example the device taught in U.S. Pat. No. 4,357,489 to Henderson, et al. as developed by Texas Instruments Incorporated, or suitable alternative. Many speech synthesis integrated circuits are presently commercially available in a wide variety of configurations, and are well known in the art. The variations between available synthesis chips include the amount of memory for synthesis information stored which is used to provide an output signal in the form of a frequency used to drive a speaker. The output signal can be long or short as necessary for the particular application.

Figure 2:
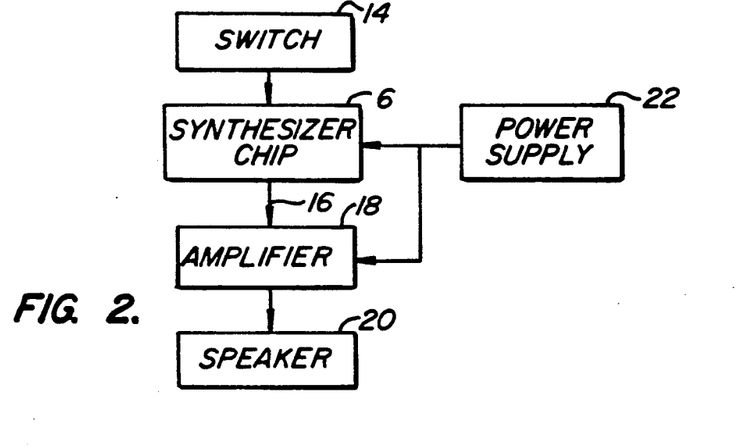
FIG. 2 is a functional block diagram of the synthesizing circuitry housed in the indicia bearing unit.

Referring now to FIG. 2, a functional block diagram of the synthesizing circuitry employed in indicia bearing unit 2 is illustrated. A functional block diagram is provided for simplicity, it being understood that one of ordinary skill will appreciate that a wide variety of electrical configurations can be used to provide the function herein described. Switch 14 is used to activate synthesizer chip 6 producing an output signal 16 which is amplified by amplifier 18 before driving speaker 20. Power supply 22 is electrically coupled to chip 6 and amplifier 18 to provide necessary current and voltage. In the preferred embodiment, power supply 22 is a battery but can have an alternative form such as a solar power device, a conventional wall outlet with transformer or other source of electrical energy.

It should be noted that the functional block diagram of FIG. 2 can be implemented by hardware devices which integrate some functions. For example, the hardware of amplifier 18 can be combined with the hardware of chip 6 or of speaker 20 in an integrated package if desired. Several commercial devices providing such packages could be used if desired. Likewise, switch 14 can be of many forms. Preferably, switch 14 is configured as touch sensitive surface 12 which provides a large surface area over indicia bearing unit 2 as shown in FIG. 1 and is well known in the art. With such an electrical contact switch device, touching anywhere along touch sensitive surface 12 activates chip 6. Switch 14 can be alternatively constructed as will be described below.

Although not necessary to practice the invention, preferably a plurality of indicia bearing units 2 are provided in a set, each indicia bearing unit 2 representing a symbol of a phoneme or group of phonemes such as the pronunciation or phonetic of an alphabetic letter or numeral. A phoneme is a sound, which combined with other phonemes make up the sounds of speech, for example the sounds of vowels or consonants. Therefore, each indicia bearing unit 2 in the embodiment shown in FIG. 1 represents the language symbol for one phoneme such as the letter "a." The symbol can be in any language and is not limited to English. A set of indicia bearing units 2 can be formed, for example, to provide the symbols representing a word or the complete alphabet of the English language. When multiple indicia bearing units are used in this way, a holder 24 is preferably provided.

Figure 3:
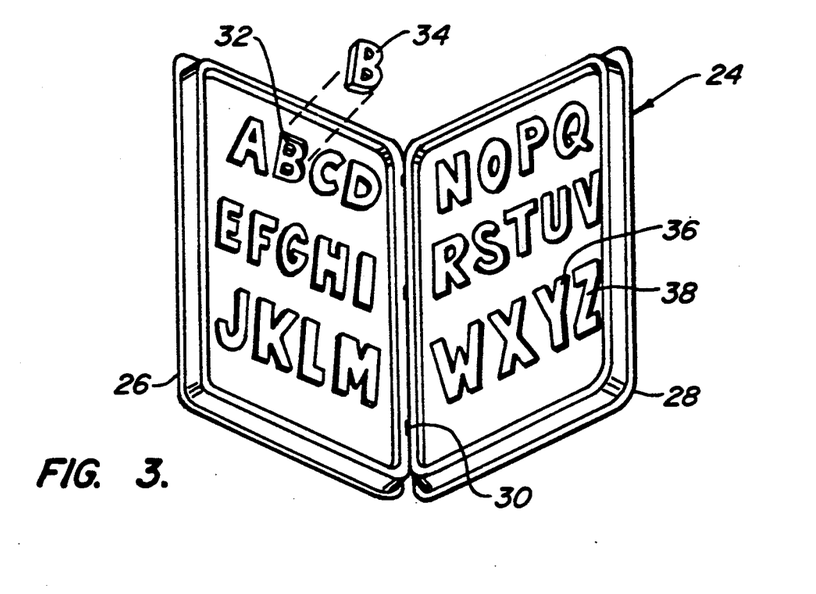
FIG. 3 is a perspective view of sample indicia bearing units in the preferred housing configured as a folding book, the housing having indicia seats for removably retaining the indicia bearing units.

FIG. 3 illustrates the preferred embodiment of holder 24 in the form of a folding book. Holder 24 has a front cover 26 and a back cover 28 pivotally connected by hinge 30. Front cover 26 and back cover 28 each have a plurality of indicia seats 32, each indicia seat configured to receive and removable retain an indicia bearing unit 34. Indicia bearing unit 34 is functionally equivalent to the indicia bearing unit 2 shown in FIG. 1 but is shown in FIG. 3 representing a capital "B." Holder 24 is illustrated having a plurality of indicia bearing units, one each representing a letter of the English alphabet. Each indicia bearing unit, for example, illustrated as "Y" 36 and "Z" 38, is removable and can be independently activated by their respective touch sensitive surfaces as previously described. Holder 24 can be closed in book fashion while retaining all the associated indicia bearing units 34, 36, 38 (and others illustrated but not numbered) to provide a secured carrying case and storage unit.

Housing 24 is preferably constructed of durable plastic material in bright colors and has rounded corners for enhanced safety. Each indicia bearing unit 2, 34, 36, 38 is also fabricated from a plastic body and includes a battery door (not shown) for removability of battery 19 when that form of power supply 22 is used. Indicia bearing unit 2, 34, 36, 38 is retained in housing 24 by a friction fit with recessed indicia seat 32, each indicia seat 32 shaped to conform with the outline of the specific symbol represented by the relevant indicia bearing unit 2, 34, 36, 38 etc. in whatever pattern or order desired. Alternatively, each indicia bearing unit 34, 36, 38 can be constructed having a small, thin rectangular backing plate on the back side in a standardized square or rectangular shape (not shown), and the recess of indicia seat would be correspondingly sized. This way, indicia bearing units 34, 36, 38 can be universally received in any indicia seat but would retain their three-dimensional appearance. FIG. 3 illustrates the indicia bearing units in alphabetic order, but holder 24 can be configured to retain the units in word patterns, crossword puzzle configuration, numerical patterns, small letters and capitals paired together, or other patterns as desired.

Figure 4:
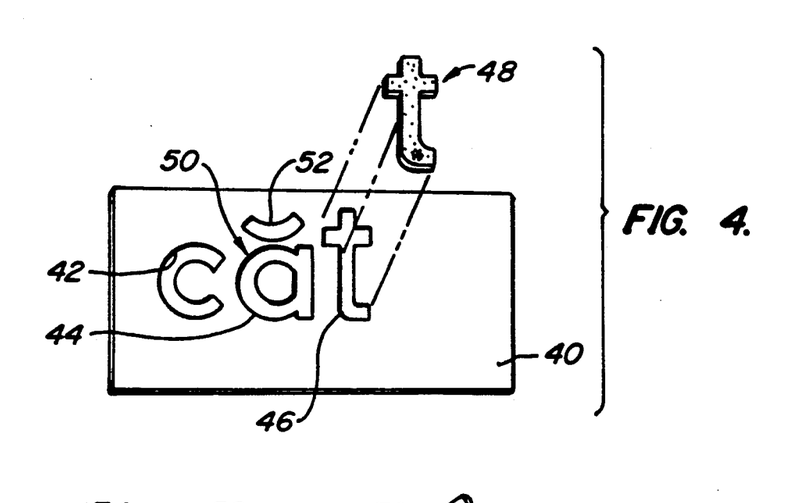
FIG. 4 is a plan view of sample indicia bearing units in an alternative housing comprising a card holder having indicia seats for removably retaining indicia bearing units in a selected order.

FIG. 4 illustrates an alternative embodiment of the holder, shown formed as card 40. Card 40 includes a plurality of indicia seats 42, 44, 46 for holding indicia bearing units 12 previously described. FIG. 4 illustrates an example card 40 configured to removable retain indicia bearing units, for example "t" 48, representing the letters to spell "cat." The "a" 50 is shown in short vowel form 52 for phonetic sound.

Figure 5:
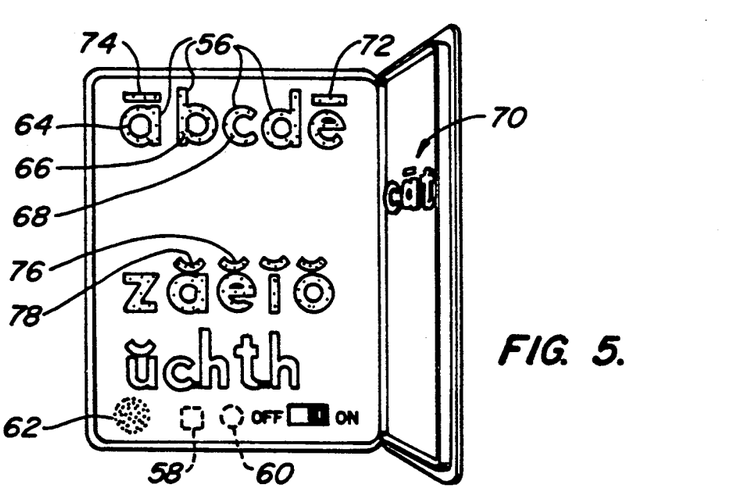
FIG. 5 is a perspective view of an alternative embodiment of the invention where the indicia bearing unit is a folding book having a plurality of raised three-dimensional fixed indicia.

Referring now to FIG. 5, an alternative embodiment of the invention is shown. In this embodiment, indicia bearing unit 54 is configured as a book having a plurality of raised three-dimensional indicia 56 each representing a phoneme. Indicia bearing unit 54 contains one synthesizing chip 58, power supply 60 and amplifier and speaker assembly 62 similar to that previously described in other embodiments. In this embodiment, however, each raised indicia 56 is not removable and has an independent switch, preferably in the form of a touch sensitive surface 64, 66, 68, etc. Each touch sensitive surface 64, 66, 68 is electrically coupled to chip 58 to activate the relevant dedicated synthesis information applicable to the letter or number represented by the raised three-dimensional indicia 56. Chip 58 contains sufficient memory in this embodiment to store information on each symbol represented in indicia bearing unit and has discrete electrical connections to each touch sensitive surface 64, 66, 68 or suitable addressing scheme. Sequential touching of touch sensitive surfaces 64, 66, 68 (and others represented) allows the user to construct the linking sounds of words 70 such as "cat." Additionally, two representations of each vowel can be provided to allow comparison of sounds. For example, one indicia can include a macron 72, 74, indicating the long vowel sound. To indicate the short vowel sound, the other indicia may include no symbol or the short vowel symbol 76, 78. Silent letters and common non-phonetic letters, i.e., "th," 80 or "ch" 82 are also included. An on-off switch 84 is also preferably provided to avoid undesired drain on the battery or power source. Note that although not shown in FIG. 1, an on-off switch is preferred to be included in all embodiments.

Figure 6:
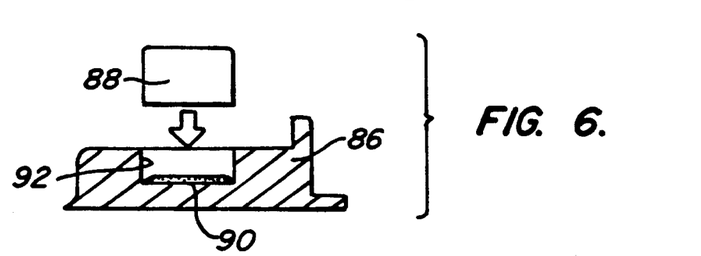
FIG. 6 is a side cross-sectional view of a portion of an alternative embodiment of the invention where the indicia bearing unit is configured as a book or card having cut-outs for receiving indicia members, the cut-outs having switches contained therein, the switches activated by pushing the indicia member into the cut-out.

FIG. 6 shows a feature of another alternative embodiment of the invention. In this embodiment, a holder 86 (in the form of a book, card or any substrate) is provided nearly identical to the embodiment just described in FIG. 5, but the touch sensitive surfaces 64, 66, 68 are replaced by passive removable three-dimensional indicia 88 used to depress an electrical switch 90 secured in the bottom of indicia seat recess 92. Each switch 90 activates chip 58 as previously described. This embodiment, however, allows the device to be produced using fewer electronic parts relative to the embodiment of FIG. 3 while retaining the user interaction with removable indicia 88. Each indicia 88 is passive, that is, it contains no electronic circuitry. Depressing indicia 88 into the applicable indicia seat recess 92 depresses switch 90 to make an electrical connection and activate chip 58. As such, indicia 88 functions as an electrical contact means when used in conjunction with switch 90. Alternatively, indicia 88 may include a metal surface which, when pressed into recess 92, makes a closed circuit electrical contact to activate chip 58.

Figure 7:
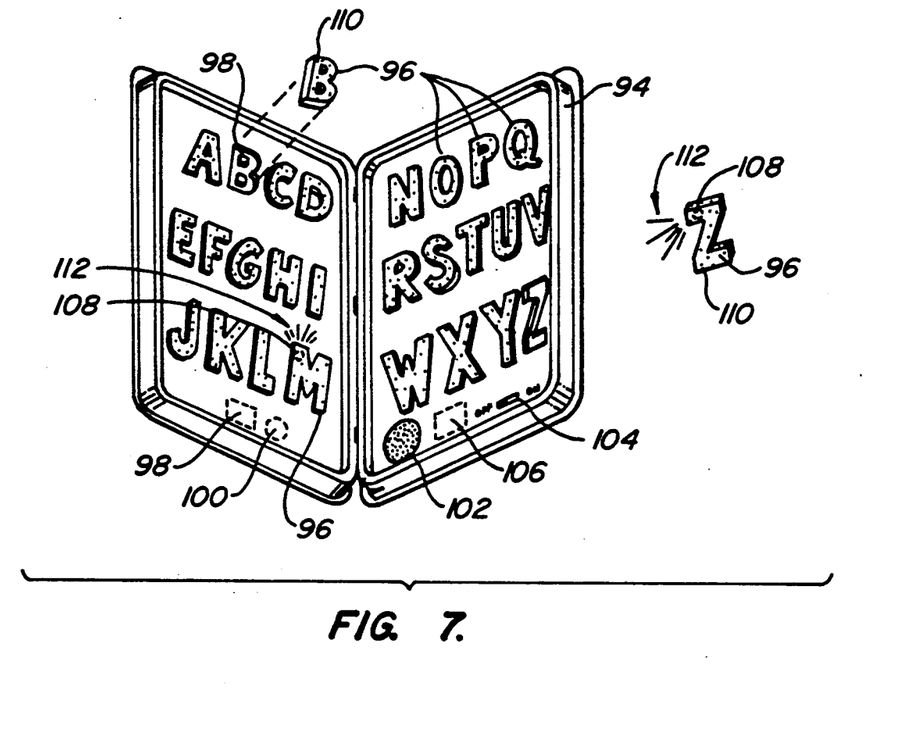
FIG. 7 is a perspective view of another alternative embodiment of the invention with the indicia bearing unit in a folding book configuration having a plurality of indicia seats for removably retaining removable indicia, the book configured indicia bearing unit including a receiver and each individual indicia including a radio frequency transmitter used to remotely activate the voice synthesis circuitry within the indicia bearing unit.

Referring now to FIG. 7, another alternative embodiment of the invention is illustrated. In this embodiment, indicia bearing unit 94 is configured as a folding book having a plurality of removable indicia 96 similar to the embodiment of FIG. 6, but with some modifications, as will be described. Indicia bearing unit 94 includes synthesizing chip 98, which is similar to the chip 58 previously described in that it has sufficient memory to store information for each symbol represented by the applicable set of removable indicia 96. Indicia bearing unit 94 also includes battery 100, speaker and amplifier assembly 102, on/off switch 104, and radio frequency receiver 106. Each removable indicia 96 includes a battery (not shown) and radio frequency transmitter 108. Each indicia 96 also include touch sensitive surface 110, which is electrically coupled to transmitter 108 to activate transmitter 108 upon user contact with touch sensitive surface 110. This embodiment therefore eliminates the necessity of having an independent voice synthesis chip in each removable indicia.

The transmitter 108 and each removable indicia 96 is uniquely tuned to transmit a selected frequency within a defined frequency range which activates receiver 106. As such, each removable indicia 96 has its own independent radio frequency assigned to it. Synthesis chip 98 and receiver 106 are electrically coupled and configured to identify the separate frequencies received by receiver to produce a dedicated indicia specific sound from synthesis chip 98 through amplifier and speaker assembly 102. In this way, an improved speaker may be economically provided, achieving enhanced audio feedback. Transmitter 108 produces a strong enough radio frequency signal 112 to be detected by receiver 106 when removable indicia 96 are either inserted into recess 98 or removed and placed within a reasonable distance of indicia bearing unit 94. Indicia bearing unit 94 also includes on/off switch 104 to conserve power and deactivate receiver 106 when not in use.

Each indicia 88 is made of bright colored durable plastic, and can take the form of letters, numbers, collections of letters or full words as a single object.

In all embodiments, the user interacts with the device to trigger a response in the form of a voice synthesis sound identifying the letter, number or symbol. The three-dimensional characteristics of the indicia bearing unit invites interaction and promotes learning. Manipulation and comparison between units teaches speech and memorization.

This invention has been described with reference to the preferred embodiments and has been presented for purposes of illustration and description. It is not intended to be exhaustive or to limit the invention to the precise form disclosed, and obviously many modifications and variations are possible in light of the above teaching. For example, the indicia bearing units may depict letters, numbers, animals or objects. The chips may be interchangeable to provide a variety of languages. The embodiments chosen and described in this description were selected to best explain the principles of the invention and its practical application to thereby enable others skilled in the art to best utilize the invention in various modifications as are suited for the particular use contemplated. It is intended that the scope of the invention be defined by the claims appended hereto.

What is claimed is:

1. An article of manufacture comprising:
    an indicia bearing unit having a three-dimensional configuration representing the language symbol of a phoneme, the indicia bearing unit comprising:
    a touch-sensitive surface switch;
    a voice synthesis chip electrically coupled to the touch sensitive surface switch, the chip activated by said switch and configured to produce a preselected electrical signal corresponding to the alphabetic letter represented by the indicia bearing unit;
    an amplifier electrically coupled to the chip and configured to receive the preselected electrical signal and generate a frequency signal; and
    a speaker coupled to the amplifier and adapted to receive the frequency signal and convert the frequency signal into audible sounds.

2. The article as defined by claim 1 wherein the chip is connected to a power supply.

3. The article as defined by claim 2 wherein the power supply is a battery and said battery is contained in the indicia bearing unit.

4. The article as defined by claim 1 wherein said language symbol represents an alphabetic letter and wherein said audible sounds comprises the phonetic pronunciation of said alphabetic letter.

5. The article as defined by claim 1 wherein said language symbol represents an alphabetic letter and wherein said audible sounds comprise the name pronunciation of said alphabetic letter.

6. The article as defined by claim 1 wherein said language symbol represents a numeral and wherien said audible sounds comprises the name pronunciation of said numeral.

7. The article as defined by claim 2 further comprising a housing for retaining a plurality of said indicia bearing units, the housing ncluding an indicia seat assigned to each indicia bearing unit, each indicia seat corresponding to the three-dimensional shape of the assigned indicia bearing unit and configured to receive and removably retain the assigned indicia bearing unit.

8. The article as defined by claim 6 wherein the indicia seats are orderly positioned to receive a collection of indicia bearing units in a pattern to form a word such that successive activation of said indicia baring units in succession produces sequential audible sounds formulating the pronunciation of a word.

9. An article of manufacture comprising:
    an indicia bearing unit including a plurality of raised three-dimensional indicia each representing the language symbol of a phoneme and having a touch sensitive surface switch portion, the indicia bearing unit comprising:
    a voice synthesis chip electrically coupled to each touch sensitive surface switch portion;
    a memory device electrically coupled to the chip, the memory storing data corresponding to a plurality of retrievable synthesis signals, each said synthesis signal corresponding to an assigned touch sensitive surface switch portion of the indicia bearing unit and activated by pressure contact with the assigned touch sensitive surface to cause the chip to produce a preselected electrical signal corresponding to the signal represented by the indicia;
    an amplifier electrically coupled to the chip and configured to receive the preselected electrical signal and generate a frequency signal; and
    a speaker coupled to the amplifier and adapted to receive the frequency signal into an audible sound.

10. The article of claim 9 wherein at least one said indicia is made removable from said indicia bearing unit and comprises an electrical contact means to connect the touch sensitive surface of the indicia to the chip.

11. The article of claim 10 wherein the electrical contact means includes an indicia seat assigned to the indicia and configured to receive and removably retain said indicia.

12. An article of manufacture comprising:
an indicia bearing unit configured to form a book having a first cover pivotally connected to a second cover, the indicia bearing unit including a plurality of indicia retention means, a voice synthesis chip electrically coupled to a memory device storing synthesis information, the voice synthesis chip electrically coupled to an amplifier, speaker and power supply; and
at least one removable indicia configured to be retained by said indicia retion means, the removable indicia having a battery and a radio frequency transmitter, said transmitter tuned to a pre-selected radio frequency and electrically coupled to a touch sensitive surface disposed on said indicia, the touch sensitive surface activating the transmitter to transmit a radio frequency receivable by the receiver to trigger the voice synthesis chip and memory to produce an output signal assigned to the dedicated radio frequency transmitted, the output signal configured to drive the speaker to generate an audible sound corresponding to the indicia.

13. The article as defined by claim 7 wherein the housing is configured as a book having a first cover pivotally connected to a second cover and moeable between an open condition and a closed condition.

14. The article as defined by claim 7 wherein the housing is substantially planar.

15. The article of manufacture of claim 9 wherein the indicia bearing unit is configured to form a book having a first cover pivotally connected to a second cover.

16. The article of manufacture of claim 9 wherein the indicia bearing unit is substantially planar.

* * * * *

REEXAMINATION CERTIFICATE (3320th)

United States Patent [19]
Wood

[11] B1 5,188,533
[45] Certificate Issued Sep. 9, 1997

[54] SPEECH SYNTHESIZING INDICIA FOR INTERACTIVE LEARNING

[75] Inventor: Michael C. Wood, Morage, Calif.

[73] Assignee: Leapfrog Rbt, L.L.C., Berkeley, Calif.

Reexamination Request:
No. 90/004,006, Oct. 16, 1995

Reexamination Certificate for:
Patent No.: 5,188,533
Issued: Feb. 23, 1993
Appl. No.: 754,989
Filed: Sep. 5, 1991

Related U.S. Application Data

[63] Continuation-in-part of Ser. No. 531,824, Jun. 1, 1990, abandoned.

[51] Int. Cl.$^6$ .................................................. G09B 5/00
[52] U.S. Cl. .................... 434/169; 434/111; 434/335; 434/339; 434/178
[58] Field of Search ........................ 434/156, 157, 434/159, 167, 169, 178, 185, 307 R, 308, 317, 322, 323, 327, 334, 337, 350, 362, 365; 446/143, 397; 341/34; 40/409, 411, 427; 273/236, 237, 273

[56] References Cited

U.S. PATENT DOCUMENTS

| | | |
|---|---|---|
| 3,146,534 | 9/1964 | Brown et al. |
| 3,172,215 | 3/1965 | Ragen et al. |
| 3,201,875 | 8/1965 | Porteus et al. |
| 3,252,230 | 5/1966 | Donev |
| 3,391,476 | 7/1968 | Sher |
| 3,477,140 | 11/1969 | Ryan et al. |
| 3,704,337 | 11/1972 | Sims, Jr. et al. |
| 3,768,179 | 10/1973 | Woodford et al. |
| 3,798,797 | 3/1974 | Mandel |
| 3,805,416 | 4/1974 | Plefkey |
| 4,664,634 | 5/1987 | Cutler et al. |
| 4,673,357 | 6/1987 | Ito |
| 4,729,564 | 3/1988 | Kuna et al. |
| 4,778,391 | 10/1988 | Weiner |
| 4,869,701 | 9/1989 | Kawai et al. |
| 4,871,176 | 10/1989 | Knetzger |
| 4,936,780 | 6/1990 | Cogliano |
| 4,968,225 | 11/1990 | Lee et al. |

*Primary Examiner*—Joe H. Cheng

[57] ABSTRACT

A three-dimensional indicia bearing unit, including a voice synthesis chip, battery and amplifier/speaker (8) for synthesizing an audible sound for educational purposes such as an interactive method for learning to read. The audible sound produced is the name and/or associated sound of the indicia bearing unit. The indicia bearing unit may be a letter, number, or alternatively, short vowel, long vowel form of a letter to produce the audible sound of the phonetic pronunciation of the letter. A plurality of unique indicia bearing units organized in a selected sequence form a set retained in a book like holder. The chip, battery and amplifier/speaker may be self-contained within each indicia bearing unit. Alternatively, the indicia bearing unit may have a book configuration with several three-dimensional letters or numbers in a fixed or removable configuration where the chip, battery and amplifier/speaker are contained within the book-like unit, the removable three dimensional letters or numbers acting as an electrical contact switch, or having individual radio frequency transmitters which send a dedicated radio frequency signal to a receiver contained within the indicia bearing unit, to activate the voice synthesis chip and produce an audible sound represented by the applicable indicia.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 7, 13 and 14 are cancelled.

Claims 1, 8, 9 and 12 are determined to be patentable as amended.

Claims 2–5, 10, 11, 15 and 16, dependent on an amended claim, are determined to be patentable.

New claims 17–32 are added and determined to be patentable.

1. An article of manufacture comprising:
an indicia bearing unit having a three-dimensional configuration representing the language symbol of a phoneme, *the language symbol being in an ordered arrangement of language symbols,* the indicia bearing unit comprising:
   (*i*) a touch-sensitive surface switch *associated with the language symbol*;
   (*ii*) a voice synthesis chip electrically coupled to the touch sensitive surface switch, the chip activated by said switch and configured to produce a preselected electrical signal corresponding to the alphabetic letter *represented by the language symbol the signal being determined by the position of the language symbol, represented by the indicia bearing unit, in the ordered arrangement of language symbols*;
   (*iii*) an amplifier electrically coupled to the chip and configured to receive the preselected electrical signal and generate a frequency signal; and
   (*iv*) a speaker coupled to the amplifier and adapted to receive the frequency signal and convert the frequency signal into audible sounds *of the phoneme represented by the associated language symbol.*

8. The article as defined by claim [6] *17*, wherein the [indicia] *plurality of* seats are orderly positioned to receive a collection of [indicia bearing units] *language symbols* in a pattern to form a word *and each language symbol received in a seat is associated with a switch,* such that successive activation of said [indicia baring units in succession] *language symbols* causes associated switches to cause the chip to activate the speaker to produce[s] sequential audible sounds formulating the pronunciation of [a] *the* word.

9. An article of manufacture comprising[:] an indicia bearing unit including:
   (*i*) a plurality of raised three-dimensional indicia *positioned in an ordered arrangement with respect to each other,* each *indicia* representing [the] *a* language symbol of a phoneme and having a touch sensitive surface switch portion[, the indicia bearing unit comprising:]
   (*ii*) a voice synthesis chip electrically coupled to each touch sensitive surface switch portion;
   (*iii*) a memory device electrically coupled to the chip, the memory *device* storing data corresponding to a plurality of retrievable synthesis signals, each said synthesis signal corresponding to an assigned touch sensitive surface switch portion [of the indicia bearing unit] and activated by pressure contact with the assigned touch sensitive surface to cause the chip to *retrieve data stored in the memory and to* produce a preselected electrical signal corresponding to [the] *a* signal represent[ed by]*ing* the indicia *as determined by the position of the indicia in the ordered arrangement*;
   (*iv*) an amplifier electrically coupled to the chip and configured to receive the preselected electrical signal and generate a frequency signal; and
   (*v*) a speaker coupled to the amplifier and adapted to [receive] *reproduce* the frequency signal into an audible sound.

12. An article of manufacture comprising:
   (*i*) an indicia bearing unit configured to form a book having a first cover pivotally connected to a second cover, the indicia bearing unit including a plurality of indicia retention means, a voice synthesis chip electically coupled to a memory device storing synthesis information, the voice synthesis chip electrically coupled to an amplifier, speaker and power supply; and
   (*ii*) at least one removable indicia configured to be retained by said indicia re*tent*ion means, the removable indicia having a battery and a radio frequency transmitter, said transmitter tuned to a pre-selected radio frequency and electrically coupled to a touch sensitive surface disposed on said indicia, the touch sensitive surface activating the transmitter to transmit a radio frequency receivable by the receiver to trigger the voice synthesis chip and memory to produce an output signal assigned to the dedicated radio frequency transmitted, the output signal configured to drive the speaker to generate an audible sound corresponding to the indicia.

17. *The article of manufacture as defined by claim 1, wherein the indicia bearing unit further includes a plurality of seats each for receiving at least one language symbol.*

18. *The article of manufacture as defined by claim 17, wherein each seat is configured to restrain from removal a language symbol received therein.*

19. *The article of manufacture as defined by claim 8, wherein each seat has a touch sensitive surface switch associated therewith and each switch can be operated, by a language symbol received in the seat, to activate the voice synthesis chip.*

20. *The article of manufacture as defined by claim 8, wherein at least one language symbol represents a combination of two letters.*

21. *The article of manufacture as defined by claim 20, wherein the at least one language symbol is one of the group consisting of th and ch.*

22. *The article as defined by claim 1 wherein the indicia bearing unit is configured as a book having a first cover pivotally connected to a second cover and moveable between an open condition and a closed condition.*

23. *The article as defined by claim 1 wherein the indicia bearing unit is substantially planar.*

24. *The article of manufacture as defined by claim 9, wherein the ordered arrangement of indicia defines a word and wherein pressure contact with the touch sensitive switch* portion of an indicia in the defined word causes the reproduction of the audible sound of a phoneme determined by the position of the indicia in the defined word.

25. The article of manufacture as defined by claim 24, wherein pressure contact with the touch sensitive switch portions of the indicia in the word, in the sequence represented by the word, causes the reproduction of the phonemes to sound the word.

26. The article of manufacture as defined by claim 9, wherein the ordered arrangement defines at least a portion of an alphabet and wherein pressure contact with the touch sensitive switch portion of an indicia arranged in the defined portion of the alphabet causes the reproduction of an audible sound associated with the name of the language symbol represented by the indicia.

27. The article of manufacture as defined by claim 9, wherein at least one indicia represents a language symbol which is a combination of two letters.

28. The article of manufacture as defined by claim 27, wherein the at least one language symbol is one of the group consisting of th and ch.

29. The article of manufacture as defined by claim 12, wherein the plurality of indicia retention means defines a plurality of seats, and each seat is configured to restrain from removal an indicia received therein.

30. The article of manufacture as defined by claim 12, wherein at least one indicia represents a language symbol which is a combination of two letters.

31. The article of manufacture as defined by claim 30, wherein at least one language symbol is one of the group consisting of th and ch.

32. The article of manufacture as defined by claim 12, wherein at least one indicia represents a language symbol.

* * * * *